United States Patent Office 3,075,286
Patented Jan. 29, 1963

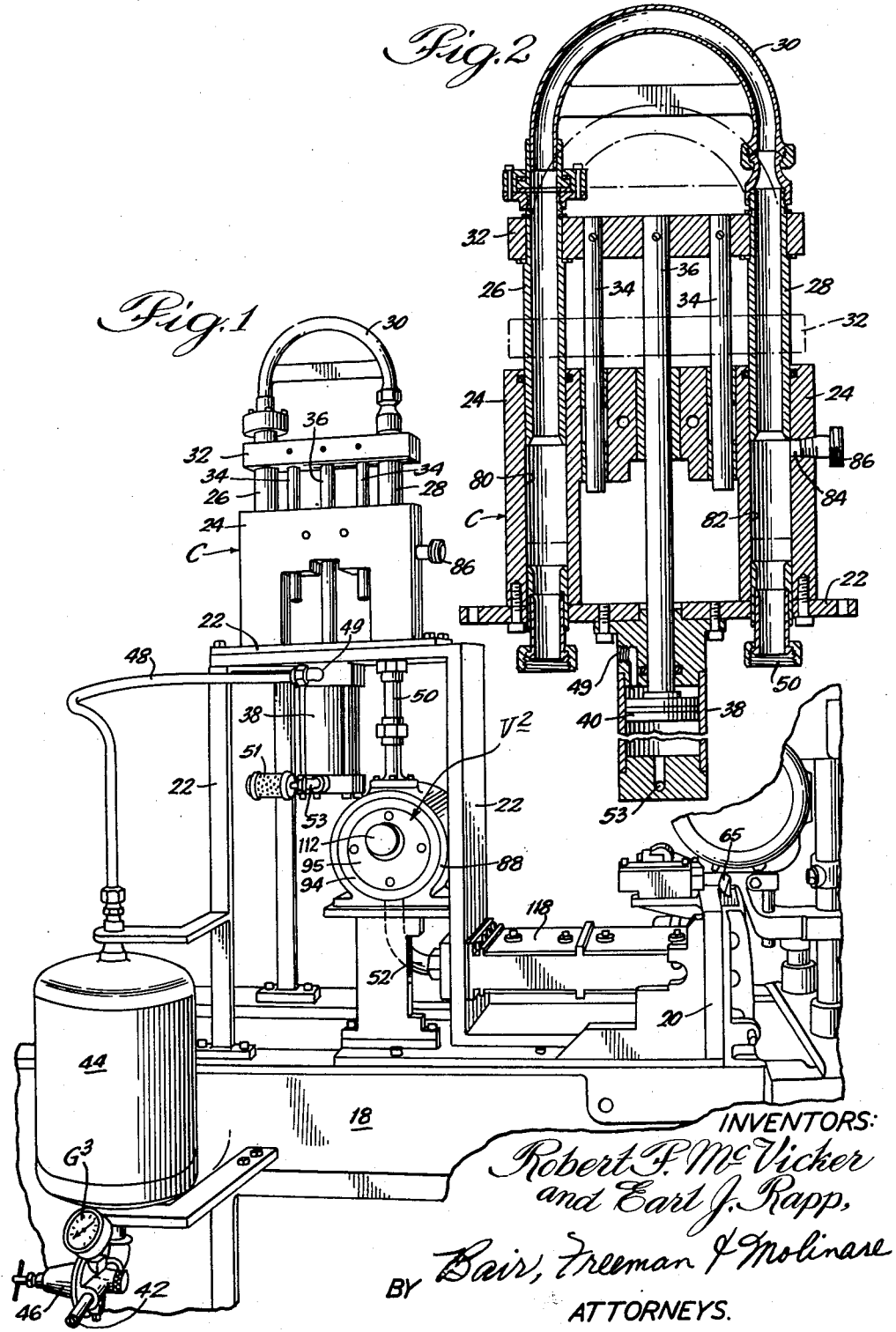

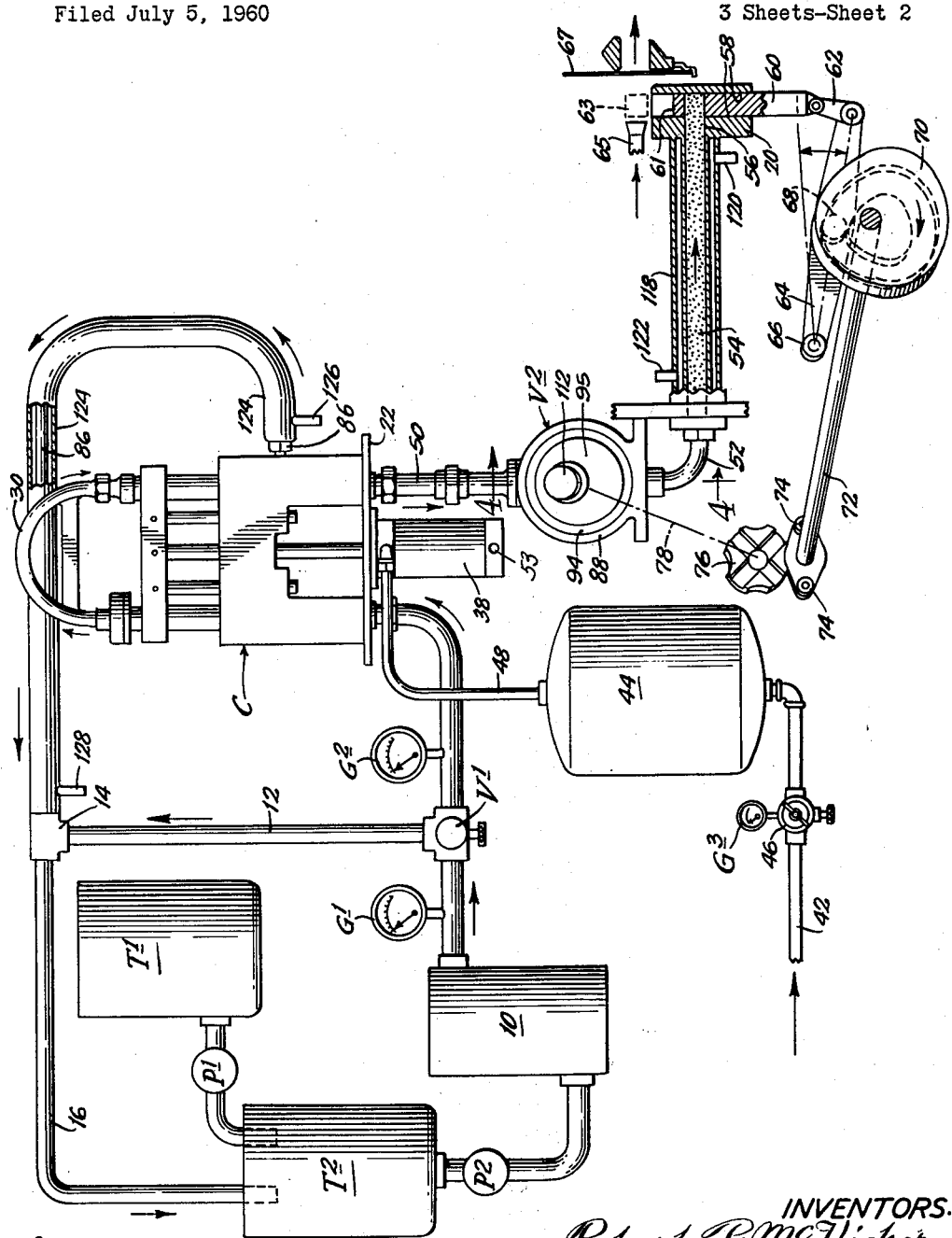

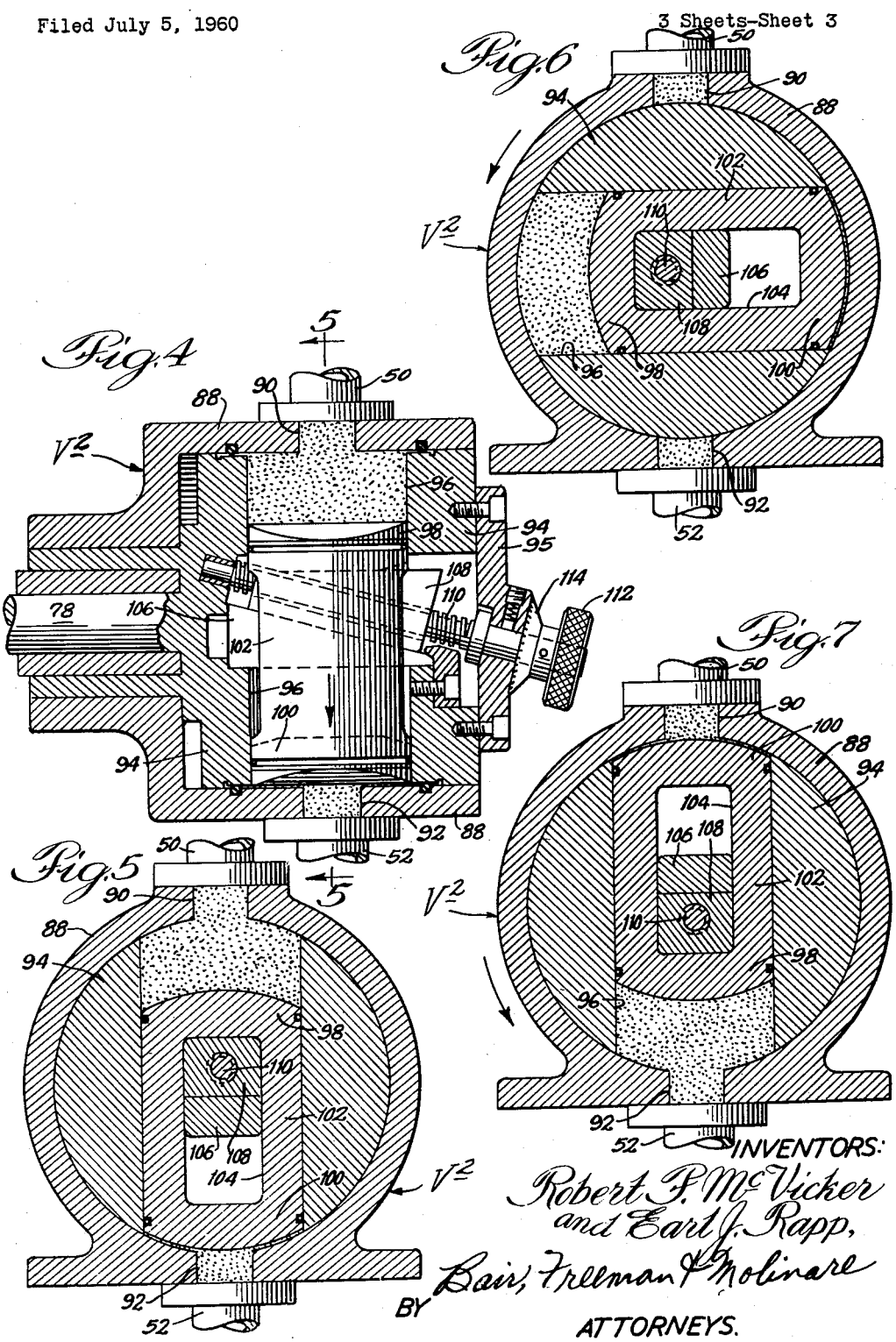

3,075,286
PRODUCT CONDITIONING AND METERING
APPARATUS
Robert F. McVicker, Anderson, Ind., and Earl J. Rapp,
Toledo, Ohio, assignors to Lynch Corporation, Anderson, Ind., a corporation of Indiana
Filed July 5, 1960, Ser. No. 40,861
10 Claims. (Cl. 31—14)

This invention relates to product conditioning and metering apparatus for margarine, butter or similar semi-liquid or plastic product which is then formed into prints that may be wrapped and packaged for sale.

One object of our invention is to provide an apparatus that receives liquid margarine, butter or the like, and accurately meters the same in properly crystallized form for wrapping and packaging to a print forming mechanism such as one of the kind shown in the Coon and Rapp Patent No. 2,592,793 of April 15, 1952.

Another object is to provide a metering and crystallizing system including a metering valve, a compensator receiving the product under a constant pressure and delivering it to the metering valve in accordance with the requirements of the valve, and a setting chamber receiving the crystallized product from the metering valve and conditioning it to the proper degree of crystallization for efficient wrapping and packaging thereof.

Still another object is to provide means to insure consistent density of the product comprising a compensator having a slidably mounted "trombone" type transfer tube that is pressure loaded with a predetermined and constant pressure to insure delivery of the product at that pressure and thereby consistent density to the metering valve in all positions thereof, which positions are compensated for by automatic movement of the trombone tube relative to the body of the compensator and by means to bypass excess product upon the trombone tube reaching a predetermined extended position.

A further object is to provide an air cylinder and piston arrangement for pressure-loading the trombone or transfer tube, the piston being backed up by air pressure at a desired value which can be controlled by the adjustment of a pressure regulator valve as required by the particular plastic product being handled, or the condition thereof, during the operation of the print forming mechanism, the disclosed arrangement being one that provides a variable chamber entirely in the line of flow between a substantially constant source of product under pressure and an intermittently operable receiver for the product.

Still a further object is to provide a rotary metering valve having a drum provided with a cross bore in which a piston is mounted and freely shiftable under the action of the pressure of the product delivered to the valve as the drum is rotated, and opposite ends of the piston thereby subjected to the pressure of the product from the compensator, the metering valve and its operation being thereby extremely simple.

An additional object is to provide a novel adjusting means for the piston to micrometrically adjust the position thereof and thereby the charge of product received and discharged from the metering valve each cycle of operation thereof, the arrangement being such that a stationary and an adjustable wedge cooperate with each other to limit the movement in opposite directions of the piston in the cross bore of the drum, and the wedges when relatively adjusted by a single adjusting means are effective on the piston to equally adjust the metering of both ends thereof in such manner that they meter exactly the same volume.

Another additional object is to provide a setting chamber which is enlarged and of predetermined length and may be jacketed for warming to secure the desired movement of product being introduced to the print forming mechanism.

With these and other objects in view, our invention consists in the construction, arrangement and combination of the various parts of our product conditioning and metering apparatus, whereby the objects above contemplated are attained, as hereinafter more fully set forth, pointed out in our claims and illustrated in detail on the accompanying drawings, wherein:

FIG. 1 is a perspective view of our product conditioning and metering apparatus;

FIG. 2 is an enlarged vertical sectional view of the compensator unit thereof;

FIG. 3 is a schematic diagram of our product conditioning and metering apparatus and the associated apparatus for supplying product thereto and receiving product therefrom to form the product into prints or the like;

FIG. 4 is an enlarged vertical sectional view on the line 4—4 of FIG. 3 showing our metering valve;

FIG. 5 is a sectional view thereof on the line 5—5 of FIG. 4;

FIG. 6 is a similar sectional view showing the metering valve rotated 90°; and

FIG. 7 is a sectional view similar to FIG. 5 showing the metering valve rotated 180° from the position of FIG. 5.

On the accompanying drawings we have used the reference character $T^1$ (FIG. 3) to indicate a mixing tank for product such as margarine, butter or the like, and $P^1$ to indicate a pump for pumping the mix in liquid form therefrom into a tank $T^2$. A pump $P^2$ pumps the product from the tank $T^2$ to a processing unit 10 such as one of the type shown in Patent No. 2,013,025, and which subjects the product to cooling and concurrent agitation. The pump $P^2$ pressurizes the product in the unit 10 so that it is delivered at some desired pressure as indicated on a gauge $G^1$ to a relief valve $V^1$ that is adjustable to control the pressure of the product as it leaves the valve $V^1$ and flows to the body 24 of a compensator C. The excess pressure is relieved through a bypass pipe 12, T fitting 14 and return line 16 to the tank $T^2$, and the pressure of the product as it leaves the valve $V^1$ is indicated on a gauge $G^2$ which serves to aid the operator in properly setting the relief valve $V^1$.

A pair of tubes 26 and 28 (FIG. 2) telescope into the body 24 of the compensator C and are connected together by a U-shaped pipe 30, the flow of product from the valve $V^1$ being through the pipes 26, 30 and 28 respectively. The pipes 26, 30 and 28 constitute a "trombone" type transfer tube. The product then flows through a pipe 50 (FIG. 3) to a metering valve $V^2$ from which a pipe 52 leads to a setting or crystallization chamber 54 mounted on the frame 18 (FIG. 1) of a print forming machine such as shown in the Coon and Rapp patent above referred to. The crystallization chamber 54 in turn terminates in a print forming head 20 (FIG. 3). A compensator frame 22 (FIG. 1) is mounted on the main frame 18 to support the compensator body 24, and a cross head 32 connects the tubes 26 and 28 together. A pair of guide rods 34 (FIG. 2) extend downwardly from the cross head 32 and are slidable in the compensator body 24. A piston rod 36 also extends downwardly from the crosshead 32 through both the body 24 and the upper cross member of the frame 22 into a cylinder 38, terminating in a piston 40 therein. The cylinder and piston combination is single-acting, being constantly supplied at a port 49 with compressed air above the piston from a pipe 48 (FIG. 1) leading from an air supply reservoir 44 to which air is supplied from a main air supply pipe 42 through an adjustable pressure regulator valve 46. A pressure gauge $G^3$ is associated therewith to determine the pressure in the line 48 and thereby in the cylinder 38. An air muffler 51 may be provided for a vent 53 from the lower end of the cylinder 38. The compensator disclosed provides a variable-length, constant-pressure passageway for the product through which all the product progresses without any "dead spots" as in prior variable branch-chamber arrangements.

The print forming head 20 (FIG. 3), as disclosed in the Coon and Rapp patent, has a rectangular bore 58 in which a plunger 60 is vertically reciprocable, the plunger having an upper portion 61 forming a cavity which at one point in the cycle of operation of the print forming machine is in alignment with a discharge opening 56 from the crystallization chamber 54 to receive the product under pressure from the chamber. The plunger 60 and its portion 61 are actuated by a link 62 pivoted to a lever 64 which in turn is pivoted at 66 to the frame 18 and carries a cam follower roller 68 coacting with a cam 70. A cycling shaft 72 rotates the cam 70 and also rotates a pair of Geneva rollers 74 that coact with a Geneva star-wheel 76 in the usual manner to rotate a shaft 78 ninety degrees each half cycle of rotation of the shaft 72. The shaft 78 is operatively connected to the metering valve V² which will hereinafter be described.

The compensator body 24 has a pair of bores 80 and 82 telescopically receiving the tubes 26 and 28 as shown in FIG. 2 and sealed relative thereto by suitable O-rings. In the uppermost position of the trombone tube 26—28—30 as shown by solid lines in FIG. 2 the tube 28 has passed the lower edge of a bypass port 84 communicating with a return line 86 leading to the T fitting 14 as shown in FIG. 3, thereby allowing the product to bypass back through the return line 16 to the tank T². The crystallization chamber 54 may be warmed by the flow of water or the like of desired temperature through a jacket 118 thereof, inlet and outlet pipes 120 and 122 therefor being shown. Also the return line 86 may be heated by a hot water jacket 124 having inlet 126 and outlet 128 to insure continued liquidation of the product as it returns through the lines 86 and 16 to the tank T² and thus promote efficient flow thereof.

Referring to FIGS. 4 and 5, the metering valve V² is shown in detail and comprises a housing 88 in which a drum 94 is rotatably mounted and suitably sealed relative thereto by O-rings as shown. The valve body 88 has an inlet 90 and an outlet 92. The drum 94 has a cross bore 96 in which piston heads 98 and 100 are mounted. The heads have suitable O-ring seals, and are integrally connected by a reduced portion 102 having a rectangular opening 104 therein. Located in the opening 104 is a stationary wedge 106 and an adjustable wedge 108. The lower face of the wedge 106 and the upper face of the wedge 108 are always parallel to each other, and the two wedges are mounted face-to-face as illustrated. Parallel to these faces is an adjusting screw 110 threaded in the adjustable wedge 108 and rotatable in the drum 94 and in a cover plate 95 thereof. An adjusting knob 112 is mounted on the screw 110 outside the valve V² and carries a calibrated dial 114 for micrometric weight adjustment indication for the product metered by the valve V². The piston element 98—100—102 is freely slidable in the cross bore 96 and propelled from one end thereof to the other end thereof by the product under pressure as will hereinafter appear. The disclosed structure is relatively simple, having but a few parts simply operated by the product itself plus a simple indexing connection to the print forming machine to time the metering valve in accordance with the cycling of the machine.

*Practical Operation*

In the operation of our product conditioning apparatus, the plastic material such as margarine or butter is mixed in the tank T¹ in the usual way and pumped to the tank T² from which the pump P² pumps it under the pressure desired as indicated on the gauge G¹ through the processing unit 10 and through the relief valve V¹ to our compensator C. The relief valve V¹ is, of course, set for the desired pressure to be supplied to the compensator as indicated by the gauge G², and a constant flow of liquid margarine or the like from the unit 10 is had through the compensator C to the metering valve V².

As for the operation of the metering valve, assuming all parts in the position shown in FIG. 3, the piston 98 has been forced downwardly by the product under pressure from the compensator C until the piston 98 has been arrested in measured stop position by engaging against the adjustable wedge 108 (as in FIGS. 4 and 5). The plunger 60 of the print forming mechanism is in its down position, the cavity in the bore 58 and between the plunger 60 and its upper portion 61 having been filled by product under pressure by the action of the trombone 26—28—30 responding to the air pressure in the cylinder 38 and thereby having expelled product from the bore 96 of the metering valve V² by the downward movement of the piston 100 therein as will hereinafter appear. Another 45° of rotation of the main shaft 72 will bring the left-hand Geneva roller 74 into the next slot of the Geneva star-wheel 76 when the plunger 60 is part way up, and rotate the shaft 78 counterclockwise 90° while the plunger 60 is moving on up to the top of its stroke. A print of the product at that time will be at the dotted position indicated 63 ready to be pushed by a pusher 65 against the wrapper 67 as disclosed in the Coon and Rapp patent.

The upper cavity above the piston 98 shown in the cross bore 96 of the valve drum 94 of FIGS. 4 and 5 is now rotated part way between its upper and lower position as in FIG. 6 and the product therein is at rest. It remains at rest during another 90° of rotation of the main shaft 72 while the plunger 60 is moving part way down. During the last part of the movement of the plunger downwardly the star-wheel 76 is rotated another 90° so that the piston 98 is now down and the piston 100 is up as in FIG. 7.

The constant pressure in the compensator C on the product now causes the product to move downwardly through the pipe 50 into the upper end of the cross bore 96 forcing the piston 100 downwardly and likewise the piston 98 downwardly, the one to receive the next metering charge and the other to discharge the last metered charge to the crystallization chamber 54. This does not happen, however, until the cavity between the plunger 60 and its portion 61 starts communicating with the discharge opening 56 and the product is thereupon forced by the downward movement of the trombone 26—28—30 under the action of the air on the piston 40 to fill the cavity in the metering valve with the material for forming the next charge, and to fill the cavity in the plunger 60 with the material for forming the next print.

As soon as the trombone starts moving downwardly, the bypass 84 is closed off and there is a closed system from the relief valve V¹ to the metering valve V² which is being reduced in volume by the action of the piston 40 to propel the product out of the compensator C and into the metering valve and at the same time propel the metered charge out of the metering valve and into the crystallization chamber 54 to displace product for forming the next print from the discharge opening 56 of the chamber.

In the first cycle above described the piston 98 engaged the adjusting wedge 108 as a stop (FIGS. 4 and 5), whereas in the second cycle described the piston 100 will engage the stationary wedge 106 as a stop (when 98—100—102 moves down after the FIG. 7 position). Exactly the same metering is had from either piston 98 or 100 since the distance between the facing surfaces of the pistons 98 and 100 remain the same and likewise the distance between the lower face of the wedge 106 and the upper face of the wedge 108 remains the same (until readjusted of course). Thus, the metering valve can rotate 180° per cycle of the print forming machine represented by 360° of rotation of the main shaft 72 and operate each half revolution to discharge a metered amount of product to the print forming mechanism and receive a volume-metered amount of product from the compensator. At the same time we use an "in-line" compensator to control the density of the product. The weight of each print of the product is thus accurately controlled within very close limits.

While we have shown means to apply a constant pressure to move the transfer tube 30 and the telescoping tubes 26—28 downwardly in FIG. 2, this pressure is needed only when the metering valve $V^2$ is in product receiving and discharging position as in FIGS. 4, 5 and 7, and can be relaxed during the intermediate positions of the metering valve such as shown in FIG. 6 ($V^2$).

Some changes may be made in the construction and arrangement of the parts of our product conditioning and metering apparatus without departing from the real spirit and purpose of our invention, and it is our intention to cover by our claims any modified forms of structure or use of mechanical equivalents which may reasonably be included within their scope.

We claim as our invention:

1. In a product metering apparatus for a cyclically operable print forming mechanism, a metering valve, a compensator receiving product and discharging it to said metering valve, and said metering valve discharging the product to said print forming mechanism, said compensator comprising a body having a pair of bores therein, one receiving product and the other discharging product, said bores extending parallel to each other, a transfer tube having opposite ends telescopically mounted in said bores, actuating means for moving said tube ends simultaneously into both of said bores comprising a piston and cylinder unit, means for supplying actuating fluid under constant pressure to said cylinder for moving said piston and thereby said transfer tube, and a bypass for relieving excess product from said compensator body comprising a bypass opening communicating with one of said bores and uncovered by one end of said transfer tube when said transfer tube is at a predetermined limit of outward movement relative thereto, said metering valve comprising a casing, a drum rotatable therein, said drum having a cross bore, a piston in said cross bore and freely floating therein, said valve casing having opposite inlet and outlet ports, stop means for limiting the throw of said piston in said cross bore and thereby determining the metered charge of product entering said cross bore to fill one end thereof and move said piston to extrude product from the other end thereof to said print forming mechanism, said metering valve being timed for rotation 180° per cycle of operation of said print forming mechanism.

2. In a product metering apparatus adapted to receive and discharge product, a metering valve, and a compensator receiving the product and discharging it to said metering valve, said compensator comprising a body having a pair of bores therein, one receiving product and the other discharging product, said bores extending parallel to each other, a transfer tube having opposite ends extending in the same direction and telescopically mounted, one in each of said bores, actuating means for moving said tube ends simultaneously into said bores comprising a piston and cylinder unit, means for supplying actuating fluid under constant pressure to said cylinder for moving said piston therein and thereby said transfer tube, and a bypass port in one of said bores for relieving excess product from said compensator body when the end of said transfer tube in said one of said bores is at a predetermined limit of outward movement relative thereto and thereby uncovers said bypass port.

3. In a product metering apparatus for use with a print forming mechanism, a metering valve, a compensator receiving product and discharging it to said metering valve and said metering valve discharging the product to said print forming mechanism, said compensator comprising a body having a pair of bores therein, one receiving product and the other discharging product, said bores extending parallel to each other, a transfer tube having opposite ends telescopically mounted in said bores, actuating means for moving said transfer tube ends into said bores with a constant pressure during the time the metering valve is in position to receive product from said compensator and discharge product to said print forming mechanism, said metering valve comprising a casing, a drum rotatable therein, said drum having a cross bore, a piston in said cross bore, said valve casing having opposite fill and extrude ports, and means for limiting the throw of said piston in said cross bore and thereby determining the metered charge of product entering said cross bore to fill one end thereof and thereby move said piston along said bore to effect extrusion of product from the other end thereof.

4. In a product metering apparatus for supplying product to a cyclically operable print forming mechanism, a metering valve, a compensator receiving product and discharging it to said metering valve, said compensator comprising a body having a pair of bores therin, one receiving product and the other discharging product, a transfer tube having opposite ends telescopically mounted in said bores, actuating means for moving said tube ends simultaneously into said bores, said metering valve comprising a casing having opposite inlet and outlet ports, a drum rotatable therein, said drum having a cross bore, a piston in said cross bore driven along the cross bore by product entering the same from said inlet port, means for limiting the throw of said piston in said cross bore and thereby determining the metered charge of product therefrom to said print forming mechanism, said metering valve being timed for rotation 180° per cycle of operation of said print forming mechanism.

5. A product metering apparatus comprising a metering valve and a pressure compensator, said compensator receiving a constant flow of plastic product and supplying the same to said metering valve under substantially constant pressure, said metering valve operating intermittently, said compensator comprising a variable length conduit and means to effect restriction of the length thereof and bypass product therefrom when at maximum length, said metering valve comprising a valve casing, a drum rotatable therein having a cross bore, means to cyclically index said drum in said valve casing, a piston movable in said cross bore by the product entering one end thereof to expel product from the other end thereof, said valve casing having opposite inlet and outlet ports, said piston having closed ends and an open center, adjustable means comprising a pair of wedges in said open center for limiting the throw thereof in said cross bore, one of said wedges being stationary and the other being adjustable longitudinally relative thereto and thereby adjusting the distance across said pair of wedges for determining the metered charge of product entering one end of said cross bore to fill that end thereof and move said piston to extrude product from the other end thereof.

6. A product metering apparatus comprising a metering valve and a pressure compensator, said compensator receiving a constant flow of plastic product and supplying the same to said metering valve under substantially constant pressure when said metering valve is open to receive the same, said metering valve operating intermittently, said compensator comprising a variable length conduit and means under pressure to restrict the length thereof, said metering valve comprising a valve casing, a drum rotatable therein having a cross bore means to cyclically index said drum in said valve casing, a piston movable in said cross bore by the product entering one end thereof whereupon said piston expels product from the other end of said cross bore, said valve casing having opposite inlet and outlet ports, and adjustable means for limiting the throw of said piston in said cross bore.

7. An apparatus of the character described comprising a metering valve, a pressure compensator receiving a substantially constant flow of plastic product and delivering the same under substantially constant pressure to said metering valve, said valve operating intermittently, said compensator comprising a variable capacity chamber in the line of flow and means under constant pressure to restrict the capacity thereof, said metering valve comprising a rotatable drum having a cross bore, means to index said drum in said casing, a piston movable in said cross bore by the product entering one end thereof to move the piston whereupon the piston expels product from the other end of said cross bore, said valve casing having opposite fill and extrude ports, said piston having opposite closed ends and an open center, and adjustable means comprising a pair of wedges in said open center of said piston for limiting the throw thereof in said cross bore, one of said wedges being stationary and the other adjustable along an inclined face of said stationary wedge.

8. A metering apparatus comprising a metering valve and a pressure compensator for supplying plastic product under pressure thereto, said metering valve comprising an indexable drum having a cross bore, a piston movable in said cross bore by the product entering one end thereof to cause said piston to move along said cross bore and expel product from the other end thereof, said valve casing having opposite fill and extrude ports, said piston having opposite closed ends and an open center, adjustable means comprising a pair of wedges in said open center of said piston for limiting the throw thereof in said cross bore, one of said wedges being stationary and the other being adjustable relative thereto and thereby determining the metered charge of product entering either end of said cross bore with both charges exactly the same volume.

9. A product metering apparatus comprising a metering valve and a pressure compensator receiving a constant flow of plastic product and supplying the same to said metering valve under substantially constant pressure at the time the metering valve is open to receive the same, said metering valve operating intermittently, said compensator comprising a variable length conduit and means under constant pressure to restrict the length thereof, said metering valve comprising a valve casing, a drum rotatably therein having a cross bore, means to cyclically index said drum in said casing, a double-end piston movable in said cross bore by the product entering one end thereof and effecting expulsion of product from the other end thereof, said valve casing having opposite inlet and outlet ports, said piston having a slot between the ends thereof, and a stop in said slot adjustable in width lengthwise of said slot.

10. An apparatus of the character described comprising a metering valve and a pressure compensator receiving a substantially constant flow of plastic product and delivering the same under substantially constant pressure to said metering valve when open to receive the same, said valve operating intermittently, said compensator comprising a variable capacity chamber in the line of flow and means under pressure to restrict the capacity thereof, said metering valve comprising a drum rotatable in said casing and having a cross bore, means to index said drum periodically, a piston movable in said cross bore by the product entering one end thereof to move said piston along the bore and thereby expel product from the other end of said cross bore, said valve casing having opposite fill and extrude ports, said piston having a slot lengthwise thereof and terminating short of the ends thereof, and adjustable means comprising a pair of wedges in said slot of said piston for limiting the throw thereof in said cross bore, one of said wedges being stationary and the other adjustable along the face thereof to vary the effective width of said wedges with respect to the length of said slot.

References Cited in the file of this patent

UNITED STATES PATENTS 2,683,932    Steenhuis _____ July 20, 1954

FOREIGN PATENTS 808,729    Great Britain _____ Feb. 11, 1959